United States Patent
Hussain et al.

(10) Patent No.: US 8,806,959 B2
(45) Date of Patent: Aug. 19, 2014

(54) CORIOLIS MASS FLOWMETER

(75) Inventors: Yousif Hussain, Weston Favell (GB);
Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 193 days.

(21) Appl. No.: 13/553,069

(22) Filed: Jul. 19, 2012

(65) Prior Publication Data

US 2013/0042701 A1  Feb. 21, 2013

(30) Foreign Application Priority Data

Aug. 16, 2011  (DE) .......................... 10 2011 110 165

(51) Int. Cl.
  *G01F 1/84*  (2006.01)
(52) U.S. Cl.
  USPC .................................................... 73/861.355
(58) Field of Classification Search
  USPC ....................................... 73/861.355–861.357
  See application file for complete search history.

(56) References Cited

U.S. PATENT DOCUMENTS

| | | | |
|---|---|---|---|
| 4,127,028 A | 11/1978 | Cox et al. | |
| 4,825,705 A | 5/1989 | Hohloch et al. | |
| 5,078,014 A * | 1/1992 | Lew | 73/861.355 |
| 5,271,281 A | 12/1993 | Mattar et al. | |
| 5,423,221 A | 6/1995 | Kane et al. | |
| 5,627,326 A * | 5/1997 | Alesz et al. | 73/861.357 |
| 5,663,509 A | 9/1997 | Lew et al. | |
| 5,675,093 A | 10/1997 | Young et al. | |
| 7,168,329 B2 * | 1/2007 | Bell et al. | 73/861.355 |
| 8,096,192 B2 | 1/2012 | Shimizu et al. | |
| 8,404,076 B2 * | 3/2013 | Young et al. | 156/308.2 |
| 2003/0097881 A1 * | 5/2003 | Schlosser et al. | 73/861.355 |

FOREIGN PATENT DOCUMENTS

| | | |
|---|---|---|
| DE | 297 09 692 U1 | 7/1997 |
| EP | 0 239 679 A1 | 10/1987 |
| EP | 1 154 243 A1 | 11/2001 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A Coriolis mass flowmeter with at least one measurement tube (2) for forming a flow channel, at least one vibration generator and at least one vibration pick-up, the measurement tube (2) having one inlet end (4), two vibration sections (3a, 3b) and one outlet end (5) and being bent at least in sections such that two U-shaped or V-shaped vibration sections (3a, 3b) which run in essentially parallel planes are formed, and the vibration sections (3a, 3b) can be excited to vibrations by the vibration generator. The flow channel, except for the inlet end (4), the vibration sections (3a, 3b) and the outlet end (5), runs within a solid base (6).

11 Claims, 6 Drawing Sheets

CORIOLIS MASS FLOWMETER

BACKGROUND OF THE INVENTION

1. Field of the Invention

The invention relates to a Coriolis mass flowmeter with at least one measurement tube for forming a flow channel, at least one vibration generator and at least one vibration pick-up, the measurement tube having an inlet end, two vibration sections and an outlet end and being bent at least in sections such that two U-shaped or V-shaped vibration sections which run in essentially parallel planes are formed, and the vibration sections being excited to vibrations by the vibration generator.

2. Description of Related Art

Coriolis mass flowmeters have been known for a long time in a host of configurations. For mass flowmeters which are based on the Coriolis principle, the measurement tube through which a medium can flow or the measurement tubes through which a medium can flow are excited by a vibration generator to a vibration which preferably corresponds to a certain natural resonance frequency. On the inlet and outlet side, inertial forces act differently on the flowing medium in the measurement tube which has been excited to vibrations, and thus, on the measurement tube itself so that the deflection of the measurement tube on the inlet and outlet side is influenced differently so that the vibrations of the measurement tube which have been detected on the inlet and outlet side with vibration pick-ups have a phase shift which is a direct measure for the mass flow rate of interest. By means of evaluation electronics, the measurement quantity, specifically the mass flow rate, is derived from the phase shift. If the Coriolis mass flowmeter is installed in a pipeline system, external vibrations can be transmitted to the flowmeter and can adversely affect the measurement result. In particular for small Coriolis mass flowmeters which are designed for measuring very small flow rates this coupling of external vibrations is problematic.

SUMMARY OF THE INVENTION

Therefore, a primary object of the invention is to devise a Coriolis mass flowmeter which is suitable for measuring very small flow rates, and at the same time, has an increased insensitivity to external vibrations.

The above derived and illustrated object is achieved in a generic Coriolis mass flowmeter in that the flow channel, except for the inlet end, the vibrations sections and the outlet end runs within a base. The measurement tube is used to form at least one part of the flow channel. In the region of the vibration sections, the measurement tube is bent in a U or V shape so that, altogether, two identical vibration sections are formed which can be set into vibrations in phase opposition by the vibration generator. Furthermore, the vibration pick-ups which detect the phase difference of the vibrations in the mass flow from which the actual measurement quantity, the mass flow rate, is derived, are attached to the vibration sections.

The behavior of the flow in the flow channel is such that the medium to be measured flows through the vibration sections in the same direction. The base is preferably made of a material which has a high density and/or good damping properties. Except for the inlet end, the vibration sections and the outlet end, the flow channel runs completely within the solid base. The base is the supporting element of the Coriolis mass flowmeter and the measurement tube is attached to it. The vibration sections are necessarily located outside the base since, otherwise, vibration would not be possible. Furthermore, the preferably short inlet end and the preferably short outlet end are located on two opposite sides of the base and project out of it so that the Coriolis mass flowmeter can be advantageously mounted in a pipeline system. Preferably, both the inlet end and also the outlet end have a flange so that the Coriolis mass flowmeter can be advantageously mounted in a pipeline system. Alternatively, however, other sealing connections, for example, a weld, are also possible. The base is made, for example, of a resin, stainless steel or even lead, depending on the configuration.

According to the invention, it is desired to provide the measurement tube or the flow channel as extensively as possible within the base so that it has the advantage that the base is used in operation of the flowmeter as a reference mass which prevents vibrations from the pipeline system which surrounds the Coriolis mass flowmeter from being coupled onto the vibration sections of the Coriolis mass flowmeter or from being decoupled from the latter onto the pipeline system which surrounds the Coriolis mass flowmeter.

Another advantage of the Coriolis mass flowmeter in accordance with the invention is that a flow divider can be omitted since only a single flow channel is formed in which the U-shaped or V-shaped vibration sections follow one another in succession. In a Coriolis mass flowmeter, the two vibration sections are always V-shaped or U-shaped.

Vibration decoupling between the vibration sections of the Coriolis mass flowmeter and a pipeline system in which the Coriolis mass flowmeter is installed is advantageously increased by a plurality of measurement tubes being present and the sections of the flow channel which run within the base being formed by recesses within the base. In this configuration, the flow channel is formed by a plurality of measurement tube sections and the recesses within the base. On the inlet side, as a short element, the inlet end is attached on one opening to the base, forming a seal, so that the measurement medium can enter the recesses within the base via the inlet end. Furthermore, the U-shaped or V-shaped vibration sections of the measurement tube are attached to the base; the medium to be measured flows through them in succession before it then emerges from the flow channel via an outlet end located opposite the inlet end. The following four elements are sealed to the base: the inlet end, a first U-shaped or V-shaped vibration section, a second U-shaped or V-shaped vibration section and the outlet end so that all elements can be supplied from the recesses which are present within the base. The recesses can be made, for example, by drilling, alternatively however any other production method is suitable for making recesses within the base. The base can also be provided with the corresponding recesses, for example, during the original forming of the base, such as by casting.

The above described configuration has the advantage that the individual elements of the measurement tube are completely decoupled from one another and are connected to one another simply via the base so that transmission of external vibrations is possible solely via the base, however, the vibrations being attenuated by the base.

Another embodiment of the Coriolis mass flowmeter in accordance with the invention which has proven especially advantageous is characterized in that there is a single measurement tube and the flow channel is formed entirely by the measurement tube. The measurement tube is bent such that it is entirely one piece from the inlet end via the two U-shaped or V-shaped vibration sections as far as to the outlet end, including the necessary intermediate distributor segments which are provided between the main elements inlet end, vibration sections and outlet end. The intermediate distributor segments provide for the medium which is to be measured flowing through the vibration sections in succession, but in the same direction.

In the latter described exemplary embodiment of a Coriolis mass flowmeter in accordance with the invention, the measurement tube is surrounded by the solid base such that only the inlet end, the vibration sections which run parallel, and the outlet end remain exposed. The base tightly adjoins the measurement tube so that there can be only very little or no vibration transmission from the inlet end to the vibration sections or from the outlet end to the vibration sections. The base is also used as a reference mass in this configuration.

The latter described embodiment of a Coriolis mass flowmeter in accordance with the invention also has the advantage that a flow divider can be omitted since the flow passes through the measurement tube continuously from the inlet end through the vibration section and the second vibration section to the outlet end.

The production of a Coriolis mass flowmeter in accordance with the invention is especially simple if the measurement tube is cast with the material of the base so that the base surrounds the measurement tube, adjoining it tightly. The measurement tube which defines the complete flow channel by its shape in this embodiment is surrounded by the cast base so that the base completely fills all intermediate spaces between the sections of the measurement tube and surrounds the measurement tube, tightly adjoining it. Only the inlet end, the two vibration sections and the outlet end project out of the base. This embodiment also offers the advantage that the base can assume any shape, but rectangular or round shapes are preferred.

In the above described embodiment of Coriolis mass flowmeters in accordance with the invention, it must be watched in the choice of materials that the measurement tube does not deform if it is cast with the material of the base.

In another preferred embodiment of Coriolis mass flowmeters in accordance with the invention, increased measurement accuracy is achieved in that the vibration sections of the measurement tube are bent and arranged such that the open sides of the U-shaped or V-shaped vibration sections are oriented in the direction of the base. In this embodiment, the vibration sections are oriented such that the arcs of the U-shaped or V-shaped vibration sections project out of the base and thus form the two vibration sections which run parallel to one another. The widest point of the U-shaped or V-shaped vibration sections is thus located in the region of the base and is surrounded by it. The two vibration sections are connected to one another streamlined within the base on its opening sides so that the flow is routed from the exit of the first vibration section into the entry of the second vibration section.

Coriolis mass flowmeters in accordance with the invention can be especially advantageously integrated into a pipeline system when the measurement tube is bent and arranged such that the inlet end and the outlet end run coaxially to one another. The inlet end and the outlet end are therefore located on a common axis so that Coriolis mass flowmeters configured in this way can be easily positioned in the pipeline system. The latter described embodiment imposes some demands on an ingenious bending geometry of the measurement tube since, in addition to the U-shaped or V-shaped vibration sections which run in two parallel planes, the coaxiality of the inlet end and of the outlet end must be watched during bending.

Another embodiment of the Coriolis mass flowmeters in accordance with the invention is characterized in that, except for the vibration sections of the measurement tube, all sections of the measurement tube are located in a common plane. In this configuration, the sole measurement tube which defines the entire flow channel is bent such that only the vibration sections with their U-shaped or V-shaped regions project up or down out of the common plane, but all other sections of the measurement tube are located within this plane. Consequently, the inlet end, the intermediate distributor segments which are necessary between the vibration sections, and the outlet end all lie in one common, preferably horizontal plane from which the vibration sections project. In this embodiment of the measurement tube, the base can be easily arranged around the measurement tube.

In order to make the Coriolis mass flowmeter as compact as possible, it has been found to be advantageous if the planes of the vibration sections run orthogonally to the orientation of the inlet and of the outlet. The inlet end and the outlet end consequently project like a perpendicular of the plane out of the planes of the vibration sections. Here, an implementation is recommended such that the measurement tube, with the vibration sections, enters the base on two opposite sides. In this embodiment, the base is preferably made as a rectangular cuboid so that the vibration sections with their opening sides of U-shape or V-shape project above the base transversely to its longitudinal orientation in order to then enter the base on its opposite sides. In the case of operation of the Coriolis mass flowmeter, the vibration sections of the measurement tube in this embodiment are twisted by the vibration, especially in the area of the regions which emerge horizontally from the sides of the base while, for example, in a parallel arrangement of the vibration sections with respect to the inlet end or to the outlet end, the material of the measurement tube is vibrationally stressed to bending by the vibration of the vibration sections.

As described above, this has the advantage that the Coriolis mass flowmeter can be made very compact with respect to its longitudinal extension and the vibration of the vibration sections takes place orthogonally to the orientation of the pipeline system so that a disturbing vibration can hardly arise in this direction.

In order to additionally reduce the action of external vibrations in the Coriolis mass flowmeters in accordance with the invention, another proposal in accordance with the invention is for the vibration sections to be connected to each other in each of two sides of the base by at least a respective node plate. The node plates, which connect the horizontally running regions of the vibration sections to one another, reduce the action of external vibrations on the base.

Finally, it can be advantageous to provide the implementation of Coriolis mass flowmeters in accordance with the invention such that the inlet end, intermediate distributor segments between the vibration sections, and the outlet end have a common axis. The planes of the vibration sections run to the right and left of this axis so that the vibration sections vibrate around the common axis essentially through the attachment in the base.

In particular, there are a plurality of possibilities for embodying and developing the Coriolis mass flowmeter in accordance with the invention. In this regard reference is made to the following detailed description of preferred embodiments in conjunction with the accompanying drawings.

DETAILED DESCRIPTION OF THE INVENTION

Figure 1:
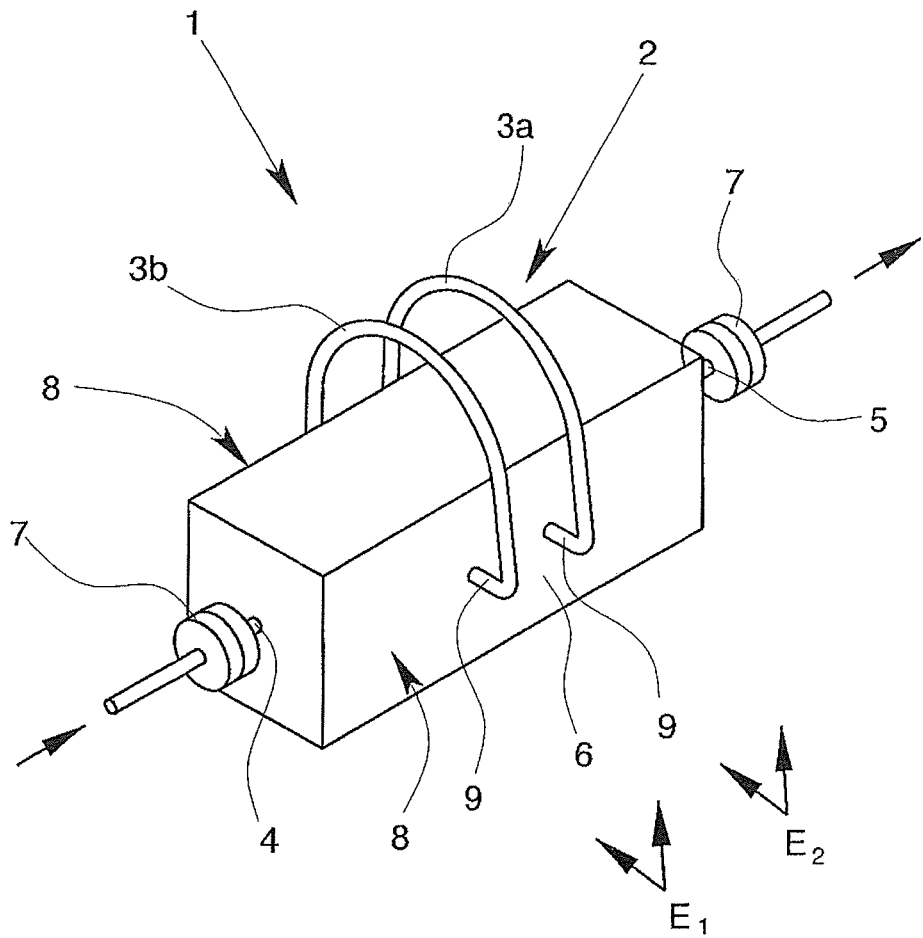
FIG. 1 is a perspective side view of an exemplary embodiment of a Coriolis mass flowmeter in accordance with the invention.
Figure 5:
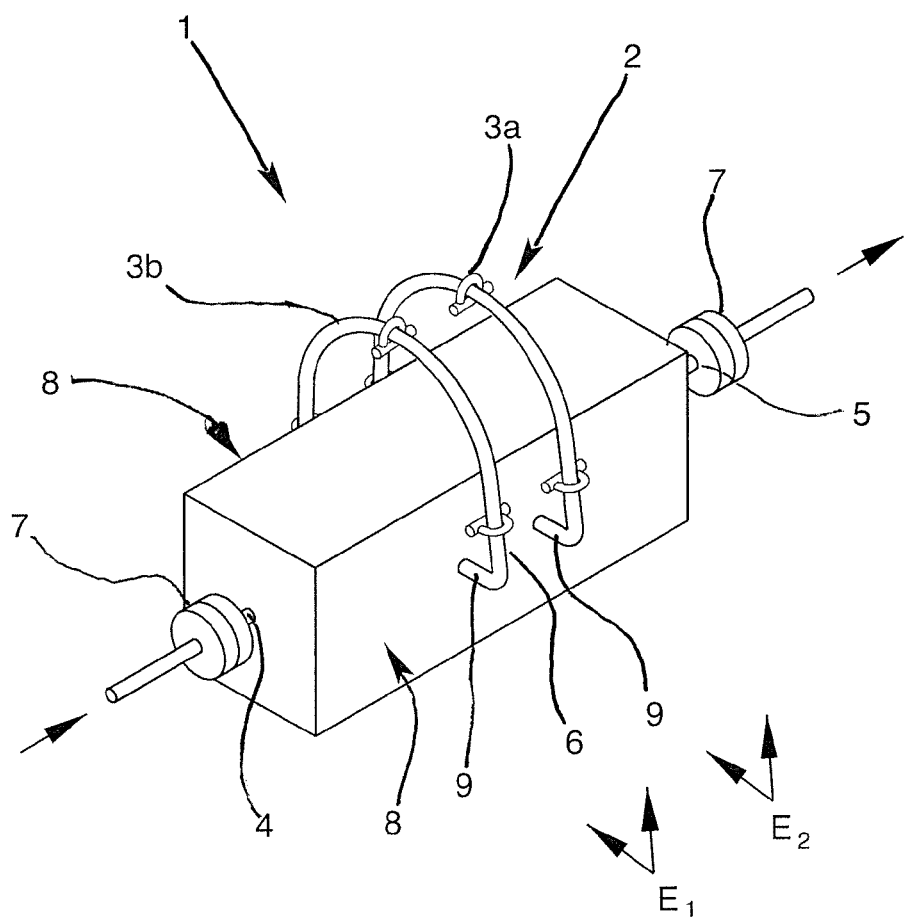
FIG. 5 shows the embodiment according to FIG. 1 with schematically depicted vibration generators and pickups.

FIG. 1 shows an exemplary embodiment of a Coriolis mass flowmeter 1 with a measurement tube 2 for forming a flow channel through which the medium which is to be measured flows. The vibration generators and vibration pick-ups which are attached to the vibration sections 3 and which run in parallel planes $E_1$, $E_2$ are conventional in construction and use, and thus, are only schematically depicted in FIG. 5. The first vibration section 3a and the second vibration section 3b can be set into vibrations in phase opposition by the vibration generator. The measurement tube 2, except for the vibration sections 3a, 3b, an inlet end 4 and an outlet end 5, is located within a solid base 6. On the inlet end 4 and on the outlet end 5 there are flanges 7 which are used to connect the Coriolis mass flowmeter 1 to the surrounding pipeline system. The pipeline system is represented by arrows in FIG. 5.

The flow channel is formed exclusively by a single measurement tube 2 which runs essentially within the base 6. The measurement tube 2 is cast with the material of the base 6 so that the base 6 surrounds the measurement tube in a tightly adjoining manner. The base 6 in this exemplary embodiment has a rectangular shape. The vibration sections 3a, 3b are bent in a U-shape and are arranged such that the opening sides of the U-shaped vibration sections 3a, 3b are oriented in the direction of the base 6. The vibration sections 3a, 3b project above the base 6 transversely relative to its longitudinal extension so that the vibration sections 3a, 3b enter the base 6 in the sides 8. The horizontally running regions 9 of the vibration sections 3a, 3b are loaded in torsion in the operating state of the Coriolis mass flowmeter 1; they are arranged orthogonally to the orientation of the inlet end 4 and of the outlet end 5 in this exemplary embodiment.

The inlet end 4 and the outlet end 5 of the measurement tube 2 lie coaxially on a common axis.

Figure 2:
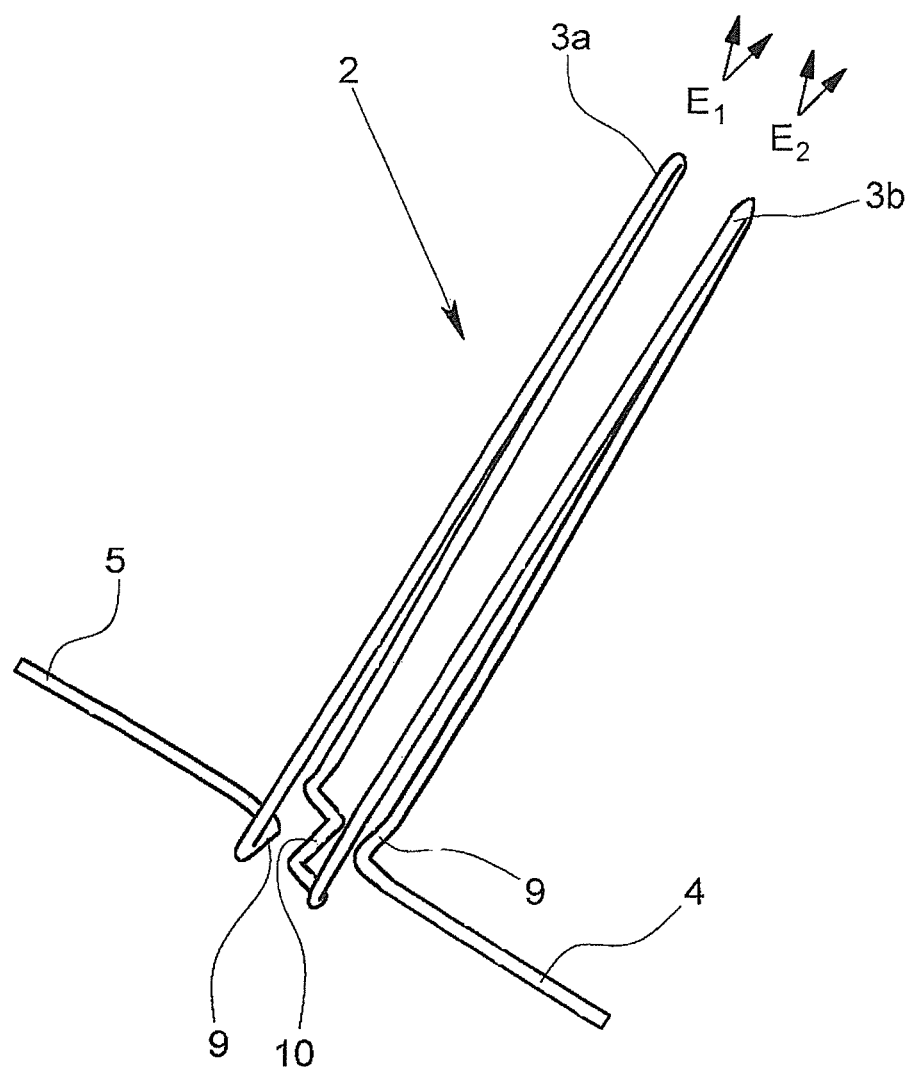
FIG. 2 is a perspective side view of the measurement tube of the Coriolis mass flowmeter according to FIG. 1.

FIG. 2 shows the measurement tube 2 of the Coriolis mass flowmeter 1 according to FIG. 1. In this measurement tube 2, the vibration sections 3a, 3b are arranged orthogonally to the orientation of the inlet end 4 and of the outlet end 5 and they run in two parallel planes $E_1$, $E_2$. Except for the vibration sections 3a, 3b, all sections of the measurement tube 2, specifically the inlet end 4, the horizontal regions 9, the intermediate distributor segments 10 and the outlet end 5 run in a common plane. Only the vibration sections 3a, 3b project out of this plane. The flow channel for the medium to be measured is completely defined by the measurement tube 2.

Figure 3:
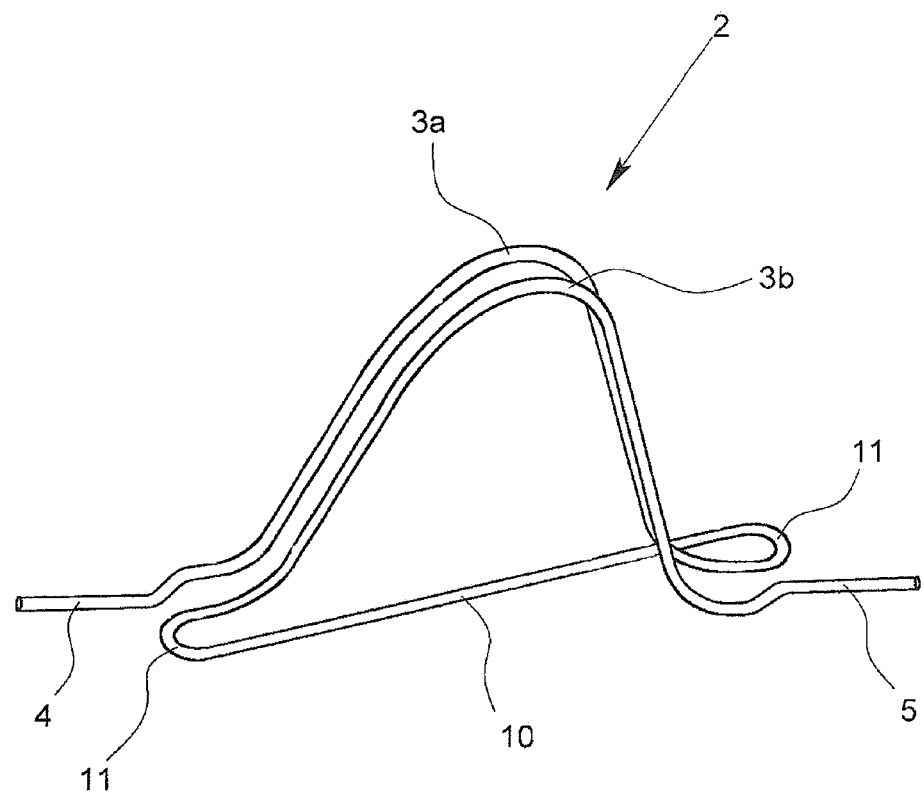
FIG. 3 shows another exemplary embodiment of a measurement tube which is suitable for a Coriolis mass flowmeter in accordance with the invention.

FIG. 3 shows another exemplary embodiment of a measurement tube 2 in which the vibration sections 3a, 3b are oriented in the same direction, like the inlet end 4 and the outlet end 5. The intermediate distributor segment 10 extends diagonally under the vibration sections 3a, 3b and is connected with a respective distributor loop 11 to each of the first vibration section 3a and to the second vibration section 3b. Both the inlet end 4 and the distributor loops 11, the intermediate distributor segment 10 and the outlet end 5 lie in a common plane. In this embodiment, the vibration sections 3a, 3b are generally V-shaped, but could be U-shaped as in the FIG. 1 embodiment.

Figure 4:
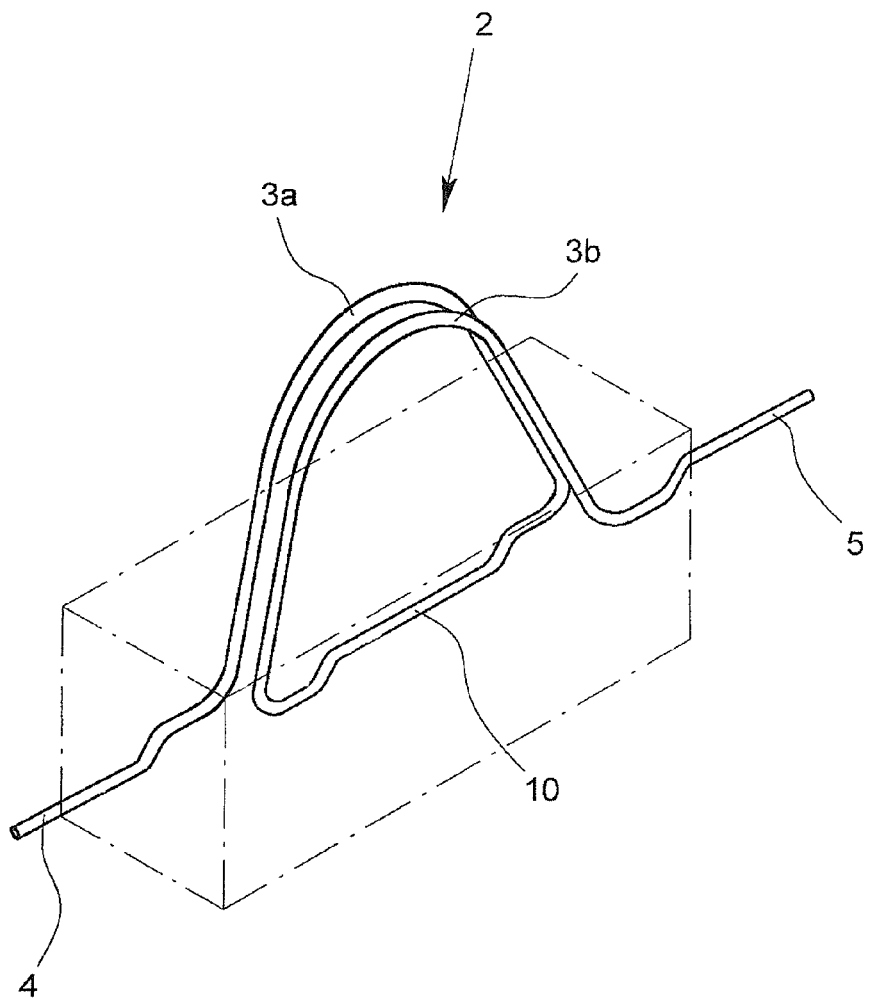
FIG. 4 shows another exemplary embodiment of a measurement tube for a Coriolis mass flowmeter in accordance with the invention.

Another exemplary embodiment of a measurement tube which is suitable for a Coriolis mass flowmeter in accordance with the invention is shown in FIG. 4. For this measurement tube 2, the inlet end 4, the intermediate distributor segment 10 and the outlet end 5 lie in a common plane and they are at least partially surrounded by the base 6 which is shown in phantom outline. In this exemplary embodiment, the inlet end 4, the intermediate distributor segment 10 and the outlet end 5 lie on a common axis; this entails advantages with respect to vibration engineering.

Additionally, it is pointed out that the base 6a shown in FIG. 1 can be applied to all measurement tubes 2 shown in FIGS. 2 to 4.

Figure 6:
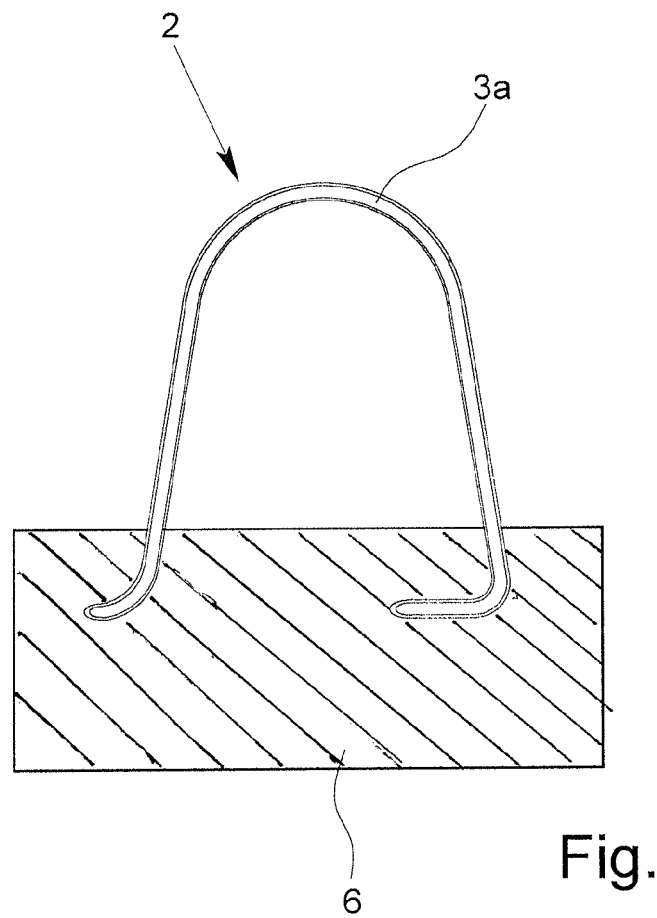
FIG. 6 is a sectional view of an embodiment in which the measurement tube is embedded within the material of the base.

In the Coriolis mass flowmeter shown in FIG. 6, there is a single measurement tube 2 and the flow channel is formed entirely by the measurement tube, sections of the flow channel which run within the base being formed by portions of the measurement tube that are embedded within the material of the base so that the base surrounds the measurement tube adjoining it tightly.

Figure 7:
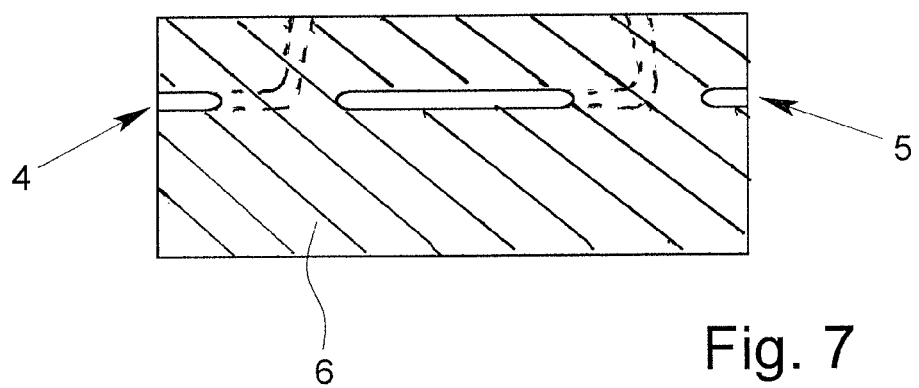
FIG. 7 is a sectional view of an embodiment wherein sections of the flow channel that run within the base are formed by recesses within the solid base.

FIG. 7 shows and embodiment in which the sections of the flow channel that run within the base are formed by recesses within the solid base.

What is claimed is:

1. Coriolis mass flowmeter, comprising:
at least one measurement tube for forming a flow channel, the measurement tube having an inlet end, an outlet end, and two vibration sections, the vibration sections being U-shaped or V-shaped sections which run in essentially parallel planes,
at least one vibration generator for exciting the vibration sections to vibrate,
at least one vibration pick-up for detecting vibrations produced by vibration of the vibration sections, and
a solid base, the flow channel, running within the solid base except for the inlet end, the vibrations sections and the outlet end of the measurement tube.

2. Coriolis mass flowmeter in accordance with claim 1, wherein sections of the flow channel which run within the base are formed by recesses within the solid base.

3. Coriolis mass flowmeter in accordance with claim 1, wherein there is a single measurement tube and the flow channel is formed entirely by the measurement tube.

4. Coriolis mass flowmeter in accordance with claim 3, wherein sections of the flow channel which run within the base are formed by portions of the measurement tube that are embedded within the material of the base so that the base surrounds the measurement tube adjoining it tightly.

5. Coriolis mass flowmeter in accordance with claim 1, wherein the vibration sections of the measurement tube are bent and arranged such that the opening sides of the U-shape or V-shape of the vibration sections are oriented in a direction toward the base.

6. Coriolis mass flowmeter in accordance with claim 1, wherein the measurement tube is bent and arranged such that the inlet end and the outlet end of the measurement tube run coaxially relative to one another.

7. Coriolis mass flowmeter in accordance with claim 1, wherein except for the vibration sections of the measurement tube, all sections of the measurement tube are located in a common plane.

8. Coriolis mass flowmeter in accordance with claim 1, wherein planes of the vibration sections run orthogonally relative to the orientation of the inlet end and of the outlet end of the measurement tube.

9. Coriolis mass flowmeter in accordance with claim 8, wherein the measurement tube enters the base on two opposite sides thereof.

10. Coriolis mass flowmeter in accordance with claim 9, wherein the vibration sections are connected to each other in each of the two sides of the base by a respective node plate.

11. Coriolis mass flowmeter in accordance with claim 1, wherein the vibration sections are arranged in planes that are parallel to the inlet end and to the outlet end.

* * * * *